United States Patent [19]
Choi

[11] Patent Number: 5,726,871
[45] Date of Patent: Mar. 10, 1998

[54] POWER SUPPLY CIRCUIT WITH POWER SAVING MODE FOR VIDEO DISPLAY APPLIANCE

[75] Inventor: Jong Ryong Choi, Kyoungsangbuk-Do, Rep. of Korea

[73] Assignee: LG Electronics Inc., Seoul, Rep. of Korea

[21] Appl. No.: 782,770

[22] Filed: Jan. 13, 1997

[30] Foreign Application Priority Data

Jan. 15, 1996 [KR] Rep. of Korea .................. 96-656

[51] Int. Cl.$^6$ .................. G05F 1/70; G06F 1/00; H02M 5/42
[52] U.S. Cl. .................. 363/89; 323/207; 364/707
[58] Field of Search .................. 363/89; 323/207; 364/707; 395/750.05

[56] References Cited

U.S. PATENT DOCUMENTS

| | | | |
|---|---|---|---|
| 5,489,837 | 2/1996 | Arakawa | 363/89 |
| 5,568,041 | 10/1996 | Hesterman | 363/89 |
| 5,617,013 | 4/1997 | Cozzi | 323/207 |
| 5,648,799 | 7/1997 | Kikinis | 395/750.05 |
| 5,657,257 | 8/1997 | Lee | 364/707 |
| 5,664,203 | 9/1997 | Hong et al. | 364/707 |

*Primary Examiner*—Stuart N. Hecker
*Attorney, Agent, or Firm*—Christie, Parker & Hale, LLP

[57] ABSTRACT

A power supply circuit for a video display appliance capable of reducing even the unnecessary power consumption caused by a power factor correction circuit when a display control for power saving is performed. The power supply circuit includes a rectifying section, a power factor correction section, an SMPS, a control section for determining whether to perform a display control for power saving of the video display appliance to provide a control signal, and a switching section for controlling the operation of the power factor correction section according to the control signal provided from the control section.

3 Claims, 1 Drawing Sheet

POWER SUPPLY CIRCUIT WITH POWER SAVING MODE FOR VIDEO DISPLAY APPLIANCE

BACKGROUND OF THE INVENTION

1. Field of the Invention

The present invention relates to a power supply circuit for a video display appliance, in particular, a power supply circuit for a video display appliance employing a switching mode power supply (SMPS) and a power factor correction circuit, which can reduce the power consumption caused by the power factor correction circuit when performing a display control for power saving.

2. Description of the Prior Art

Recently, most power supply circuits for video display appliances tend to be provided with a switching mode power supply (SMPS) because a DC or AC power supply can be easily converted into DC power supplies of various levels by the SMPS.

In some power supply circuits having an SMPS, a power factor correction circuit may be provided. The power factor correction circuit, which is to improve the power factor of the power supply by correcting the waveform of the current supplied to the SMPS to be nearly a sine wave, is generally connected in parallel to the input terminal of the SMPS. The video display appliance provided with a SMPS and a power factor correction circuit performs a display control for power saving by means of a microcomputer. In other words, in case a user does not use a video display appliance for a time or inputs a command for display control for power saving, the video display appliance reduces the voltage supplied to a cathode ray tube (CRT) from the SMPS to a predetermined level in order to perform the display control for power saving, thereby resulting in the reduction of the unnecessary power consumption caused by a normal operation of the SMPS.

FIG. 1 shows a conventional power supply circuit of a video display appliance having a power saving function. Referring to FIG. 1, the conventional power supply circuit comprises a rectifying circuit 1 for rectifying an input AC power supply, a power factor correction circuit 2 for controlling the waveform of the rectified DC power supply to provide another AC power supply the waveform of which is similar to a sine wave, an SMPS 3 for converting the power supply provided through the power factor correction circuit 2 into DC power supplies (B$^+$1–B$^+$n) of various levels, and a microcomputer 4 for determining whether to control the display for power saving of the video display appliance and providing a control signal of a high or low level to the SMPS 3.

The power factor correction circuit 2 includes a coil L1, a diode D1, a capacitor C1, a transistor Q1, and a power factor correction control circuit 2a. The rectifying circuit 1 may be easily constructed by an application of known circuits considering its rectifying characteristics.

The operation of the conventional power supply circuit for a video display appliance which has a power saving control function as constructed above will be explained.

The input AC power supply is rectified through the rectifying circuit 1. It then passes through the capacitor C1 and the diode D1 of the power factor correction circuit 2 to be supplied to the SMPS 3. At this stage, a power supply Vcc1, which was divided through a dividing circuit (not illustrated) from the power supply provided from the primary side of the SMPS 3, is continuously supplied to power factor correction control circuit 2a. The power factor correction control circuit 2a continuously provides a pulse signal having a predetermined period and level to the base of the transistor Q1. Thereby, the transistor Q1 repeats an on/off operation according to the pulse signal applied to the base.

If the transistor Q1 is in an "on" state, the current flows to the coil L1 from the transistor Q1. If the transistor Q1 is in an "off" state, the current staying in the coil L1 is accumulated in the capacitor C1 through the diode D1. Therefore, the current waveform of the power supply which is supplied to the SMPS 3 is corrected to be nearly a sine wave. That is, the power P is represented by the following equation:

$$P = V \times I \times \cos\theta$$

where, V is a voltage, I is a current, and $\cos\theta$ is a power factor.

According to the interval between the switching on and off of the transistor Q1, the current waveform of the power supply provided to the SMPS 3 becomes the shape of the switched mean value of the transistor Q1 to be nearly a sine wave. Consequently, $\cos\theta$ becomes nearly 1 to improve the power factor.

The microcomputer 4 determines whether the video display appliance is used or whether there is a command for display control for power saving at predetermined intervals. If the microcomputer 4 recognizes that the present state is a normal state, i.e., if the video display appliance is normally used, the microcomputer 4 provides a high level signal to the SMPS 3, so that a normal load voltage is supplied to the cathode ray tube (CRT). If the microcomputer 4 recognizes that a display control for power saving should be performed, for example, because a user does not use the video display appliance for a time, it provides a low level signal to the SMPS 3. Thus, the SMPS 3 provides a voltage signal lower than a predetermined level to the video display appliance to minimize the power consumption.

In the conventional power supply circuit having such a power saving function as above, however, the microcomputer 4 controls the output of the SMPS 3 when the display control for power saving is performed, to save the unnecessary power consumption. However, the power consumed by the power factor correction control circuit 2a itself cannot be saved because the power factor correction control circuit 2a receives the power supply Vcc1 from the primary side of the SMPS 3. Therefore, the conventional power supply circuit for a video display appliance cannot effectively perform the power saving control for reducing the unnecessary power consumption.

SUMMARY OF THE INVENTION

The object of the present invention is to provide a power supply circuit for a video display appliance having a switching mode power supply (SMPS) and a power factor correction circuit, which can reduce the power consumed by the power factor correction circuit when performing a display control for power saving.

To achieve the above objective, the power supply circuit for a video display appliance according to the present invention comprises:

rectifying means for rectifying an input AC power supply;

power factor correction means for correcting a current waveform of the rectified power supply provided from the rectifying means to provide another AC power supply having a current waveform of a sine wave, in accordance with a first DC power supply;

power supply means for converting the AC power supply provided from the power factor correction means into DC power supplies of various levels including the first DC power supply to be provided to the power factor correction means;

control means for determining whether to perform a display control for power saving of the video display appliance and providing a control signal; and switching means for alternatively switching the first DC power supply to be provided to the power factor correction means according to the control signal provided from the control means.

BRIEF DESCRIPTION OF THE DRAWINGS

The above object, other features, and advantages of the present invention will become more apparent by describing the preferred embodiment thereof with reference to the accompanying drawings, in which.

DETAILED DESCRIPTION OF THE PREFERRED EMBODIMENT

Figure 1:
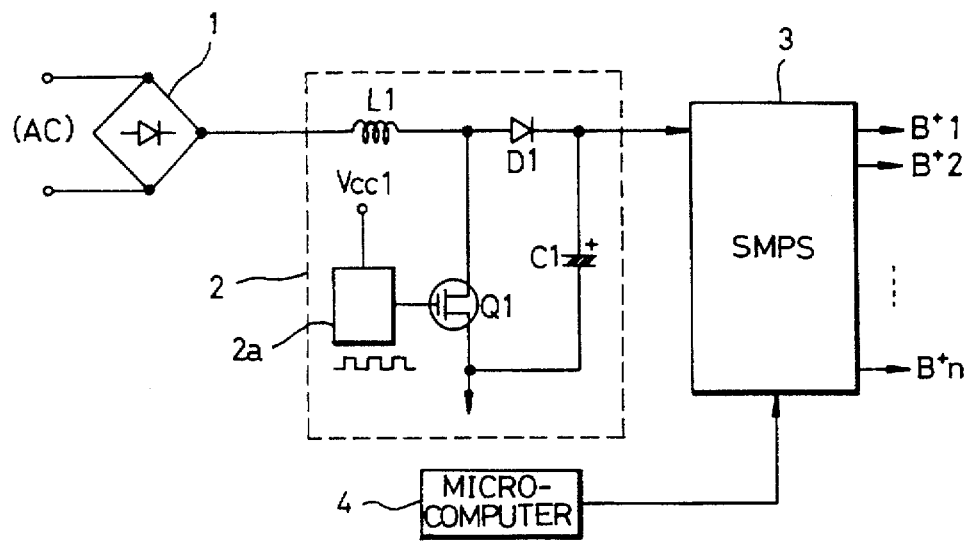
FIG. 1 is a circuit diagram of a conventional power supply circuit for a video display appliance having a power saving control function.
Figure 2:
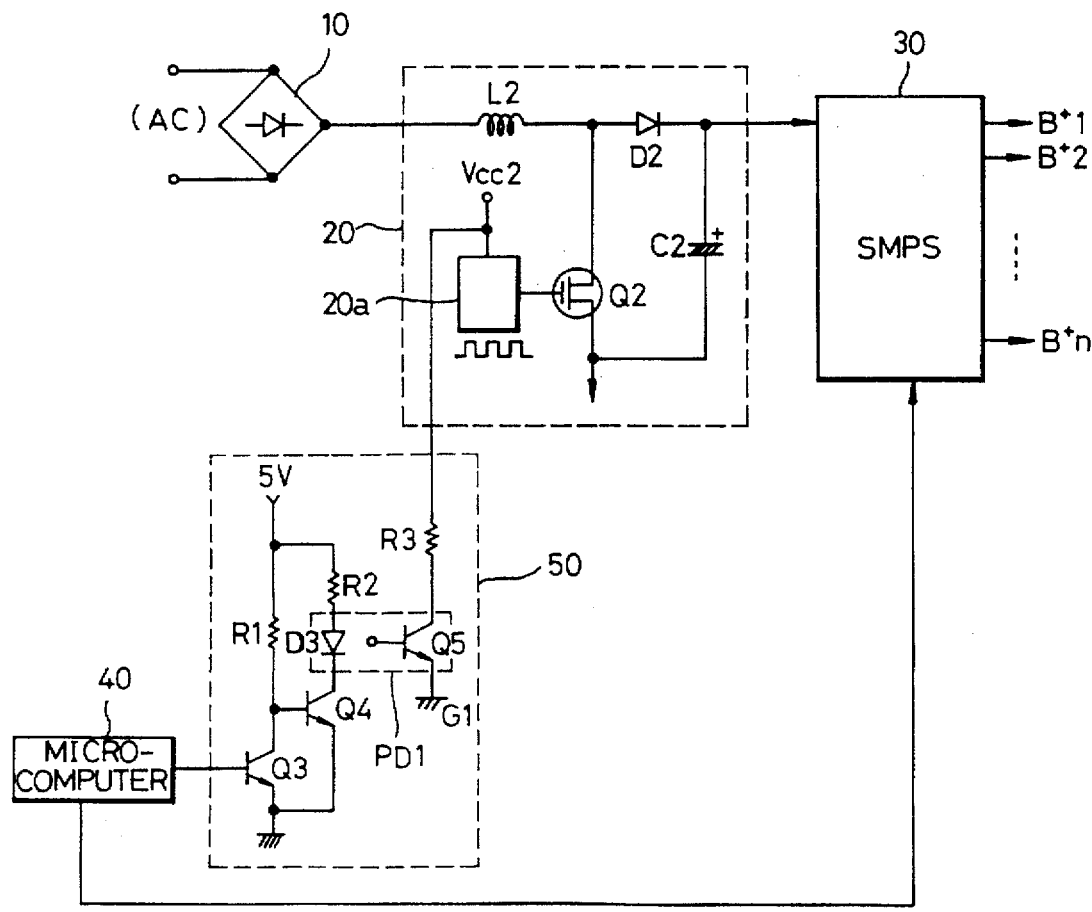
FIG. 2 is a circuit diagram of the power supply circuit for a video display appliance having a power saving control function according to the present invention.

FIG. 2 shows a power supply circuit for a video display appliance having a power saving control function according to the present invention. Referring to FIG. 2, the power supply circuit of the present invention includes a rectifying circuit 10 for rectifying an input AC power supply, a power factor correction circuit 20 for correcting the current waveform of the rectified power supply provided from the rectifying circuit 10 to provide another AC power supply having a current waveform of nearly a sine wave, an SMPS 30 for converting the AC power supply outputted from the power factor correction circuit 20 into DC power supplies ($B^+1$–$B^+n$) of various levels, a microcomputer 40 for determining whether to perform a display control for power saving and outputting a control signal of a high or low level, and a switching section 50 for alternatively switching the power supply Vcc2 supplied to the power factor correction circuit 20 from the SMPS 30 according to the high or low level control signal outputted from the microcomputer 40.

The power factor correction circuit 20 comprises a coil L2, a diode D2 for rectifying the AC power supply through the coil L2, a power factor correction control circuit 20a for receiving the power supply Vcc2 provided from the primary part of the SMPS 30 and outputting a driving pulse signal of a predetermined level, a transistor Q2 for being repeatedly switched on or off in response to the driving pulse signal of the power factor correction control circuit 20a, and a capacitor C2 for being charged the output signal of the diode D2.

The switching section 50 comprises a transistor Q3 which is switched on or off in response to the high or low level control signal outputted from the microcomputer 40, a photo coupler PD1, composed of a light emitting diode D3 and a phototransistor Q5, for controlling the power supply Vcc2 for driving the power factor correction control circuit 20a.

The operation of the power supply circuit for a video display appliance according to the present invention as constructed above will now be explained.

An input AC power supply is rectified through the rectifying circuit 10, and the rectified power supply is applied to the SMPS 30 through the capacitor C2 and diode D2 in the power factor correction circuit 20. At this stage, the power supply Vcc2 which was divided by a dividing circuit (not illustrated) from a DC power supply provided from the primary side of the SMPS 30 is continuously supplied to the power factor correction control circuit 20a. The power factor correction control circuit 20a continuously provides a pulse signal having a predetermined period and level to the base of the transistor Q2, causing the transistor Q2 to be turned on and off repeatedly.

If the transistor Q2 is in an "on" state, the current flows to the coil L2 from the transistor Q2. If the transistor Q1 is turned "off", the current staying in the coil L2 is accumulated in the capacitor C2 through the diode D2. Therefore, the current waveform of the AC power supply which is supplied to the SMPS 30 is corrected to be nearly a sine wave. Here, the current waveform of the power supply applied to the SMPS 30 becomes the shape of the switched mean value of the transistor Q2 to be nearly a sine wave. Consequently, the power factor is improved to become nearly 1.

The microcomputer 40 determines whether a user uses the video display appliance or whether there is a command for display control for power saving at predetermined intervals. If the microcomputer 40 is in a normal state, i.e., if it recognizes that a user properly uses the video display appliance, it supplies a high level control signal to the switching section 50. Accordingly, the transistor Q3 is turned on while the transistor Q4 is turned off. This causes the light emitting diode D3 and the photo transistor Q5 to be off. Thus, the power supply Vcc2 is continuously supplied to the power factor correction control circuit 20a in the power factor correction circuit 20. The SMPS 30 operates to supply a normal voltage to the CRT under the control of the microcomputer 40.

If the microcomputer 40 recognizes that the current state is abnormal, that is, a power saving control should be performed, it supplies a low level control signal to the switching section 50. Accordingly, the transistor Q3 is turned off and the transistor Q4 is turned on, causing the light emitting diode D3 and the phototransistor Q5 to be turned on. Accordingly the power supply Vcc2 to be supplied to the power factor correction control circuit 20a in the power factor correction circuit 20 is bypassed to the ground terminal G1 through the phototransistor Q5.

At the same time, the microcomputer 40 supplies a control signal for performing a display control for power saving to the SMPS 30. Thus, the SMPS 30 is controlled to provide the CRT with a voltage of lower than a predetermined level to minimize the power consumption.

As described above, according to the present invention, when a display control for power saving is performed for such reason that a user does not use a video display appliance for a time, the power supply to be supplied to the power factor correction circuit can be cut off, resulting in that the power consumption can be effectively reduced.

What is claimed is:

1. A power supply circuit for a video display appliance comprising:

rectifying means for rectifying an input AC power supply;

power factor correction means for correcting a current waveform of the rectified power supply provided from the rectifying means to provide another AC power supply having a current waveform of a sine wave, in accordance with a first DC power supply;

power supply means for converting the AC power supply provided from the power factor correction means into DC power supplies of various levels including the first DC power supply to be provided to the power factor correction means;

control means for determining whether to perform a display control for power saving of the video display appliance and providing a control signal; and switching means for alternatively switching the first DC power supply to be provided to the power factor correction means according to the control signal provided from the control means.

2. The power supply circuit according to claim 1, wherein the switching means comprises:

a first transistor which is turned on/off according to the control signal outputted from the control means;

a second transistor, coupled to the first transistor, for being turned on/off in relation to the on/off operation of the first transistor and a photocoupler, coupled to the second transistor, for being turned on/off to switch the first DC power supply provided to the power factor correction means.

3. The power supply circuit according to claim 1, wherein if the switching means is turned on, the first DC power supply to be provided to the power factor correction means is bypassed to ground.

* * * * *